United States Patent
Sanagooy

(10) Patent No.: US 11,560,466 B2
(45) Date of Patent: Jan. 24, 2023

(54) COMPOSITE MATERIAL

(71) Applicant: Pure New World Pty Ltd, Narre Warren (AU)

(72) Inventor: Mohammad Ali Sanagooy, Hallam (AU)

(73) Assignee: Pure New World Pty Ltd, Narre Warren (AU)

( * ) Notice: Subject to any disclaimer, the term of this patent is extended or adjusted under 35 U.S.C. 154(b) by 157 days.

(21) Appl. No.: 16/488,179

(22) PCT Filed: Feb. 22, 2018

(86) PCT No.: PCT/AU2018/050154
§ 371 (c)(1),
(2) Date: Aug. 22, 2019

(87) PCT Pub. No.: WO2018/152583
PCT Pub. Date: Aug. 30, 2018

(65) Prior Publication Data
US 2020/0002510 A1    Jan. 2, 2020

(30) Foreign Application Priority Data
Feb. 22, 2017  (AU) ............................... 2017900594

(51) Int. Cl.
*C08K 11/00* (2006.01)
*B29B 7/90* (2006.01)
*C08J 3/20* (2006.01)
*C08K 5/01* (2006.01)
*B29K 101/12* (2006.01)
*B29K 501/12* (2006.01)

(52) U.S. Cl.
CPC .............. *C08K 11/005* (2013.01); *B29B 7/90* (2013.01); *C08J 3/201* (2013.01); *C08K 5/01* (2013.01); *B29K 2101/12* (2013.01); *B29K 2501/12* (2013.01); *C08J 2323/06* (2013.01)

(58) Field of Classification Search
None
See application file for complete search history.

(56) References Cited

U.S. PATENT DOCUMENTS

| | | | | |
|---|---|---|---|---|
| 4,003,866 A | * | 1/1977 | Paturle | B29C 70/58 |
| | | | | 428/903.3 |
| 4,173,492 A | * | 11/1979 | Pollard | C08K 9/10 |
| | | | | 106/415 |
| 4,328,320 A | * | 5/1982 | Reszniak | C08J 9/04 |
| | | | | 521/143 |
| 2004/0204519 A1 | * | 10/2004 | Fender | C08L 101/00 |
| | | | | 524/35 |
| 2012/0077890 A1 | * | 3/2012 | Mancosh | C04B 26/125 |
| | | | | 524/427 |

FOREIGN PATENT DOCUMENTS

| | | | | |
|---|---|---|---|---|
| CN | 1616532 A | 5/2005 | | |
| CN | 101775172 A | 7/2010 | | |
| CN | 102391557 A | 3/2012 | | |
| CN | 102766291 A | 11/2012 | | |
| CN | 103360666 A | 10/2013 | | |
| CN | 104671702 A | 6/2015 | | |
| CN | 105949565 A | 9/2016 | | |
| EP | 0102145 A1 | * | 3/1984 | ............ C08L 101/00 |

OTHER PUBLICATIONS

International Search Report and Written Opinion dated Apr. 26, 2018 for PCT/AU2018/050154.

* cited by examiner

*Primary Examiner* — Christopher M Rodd
(74) *Attorney, Agent, or Firm* — Banner & Witcoff, Ltd.

(57) ABSTRACT

A composite material and method of producing a composite material for use in fabrication, building and construction is disclosed. A composition as disclosed herein comprises a high proportion of particulate waste material dispersed in a matrix of thermoplastic polymer and wax. A method of producing a composite material comprises melt mixing thermoplastic polymer and wax with a particulate material, thereby dispersing the particulate material in a melt mixture of the composite material.

17 Claims, 1 Drawing Sheet

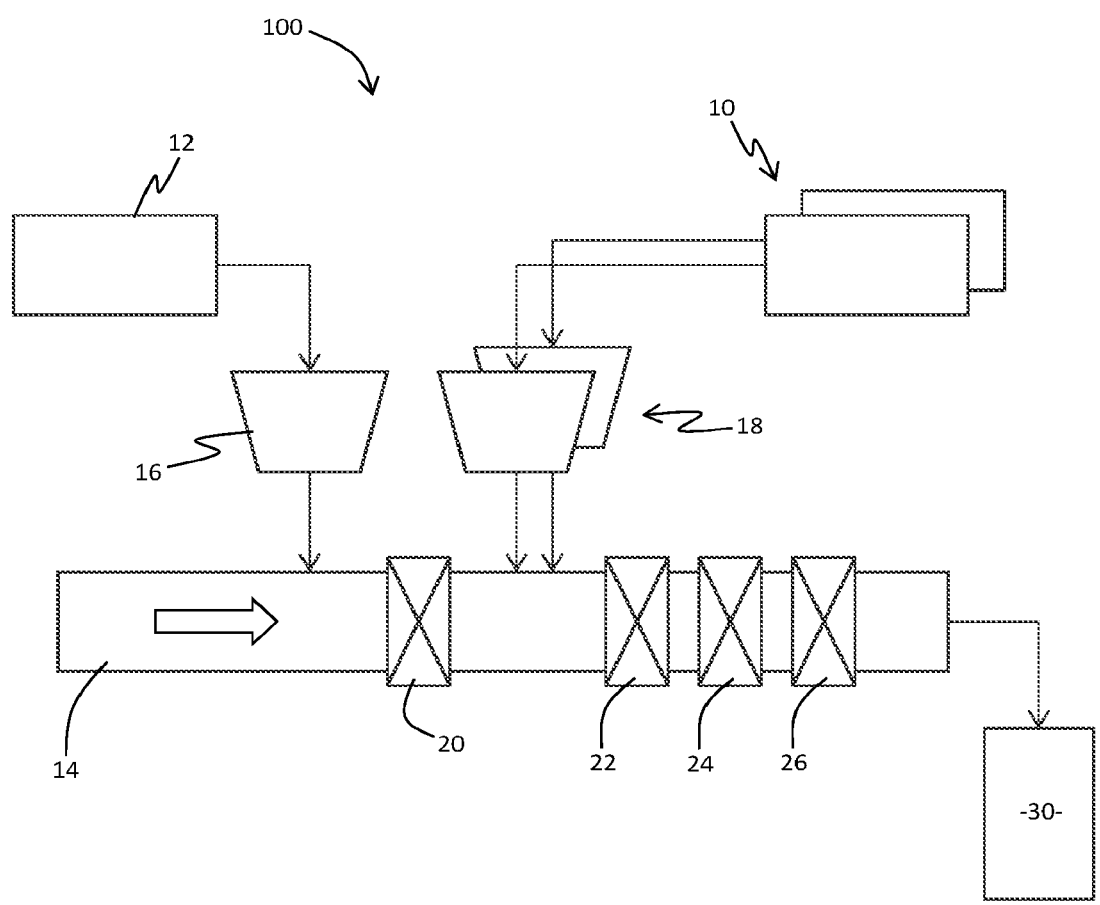

COMPOSITE MATERIAL

CROSS REFERENCE TO RELATED APPLICATIONS

This application is a U.S. National Stage application under 35 U.S.C. § 371 of the International Application PCT/AU2018/050154 (published as WO/2018/152583 A1), which claims priority to Australian Patent Appln. No. 2017900594 filed Feb. 22, 2017. The entire contents of these applications are incorporated herein by reference in their entirety.

TECHNICAL FIELD

The present disclosure relates to a composite material, in particular a composite material for use in the building and construction industries. The disclosure also relates to a method of producing a composite material.

BACKGROUND

The following discussion of the background to the disclosure is intended to facilitate an understanding of the invention. However, it should be appreciated that the discussion is not an acknowledgement or admission that any of the material referred to was published, known or part of the common general knowledge as at the priority date of the application.

In the manufacture of polymeric materials (plastics) it is known to use small amounts of about 1 to about 5 weight percent of wax to reduce the viscosity and melting point of the polymeric material and/or to act as a lubricant and mold release. Although increasing the volume of wax may lower the relative polymer volume and reduce manufacturing costs, it also detrimentally affects the mechanical strength of the polymeric material.

It is also known to use an inert filler such as calcium carbonate, talc, kaolin, barium sulphate, silica, mica, fly ash, wood flour and saw dust as a filler in plastics to change and improve the physical and mechanical properties like mechanical strength, rheological behaviour and thermal degradation. Uniform distribution of these fillers plays an important role in the enhancement of these properties.

Agglomeration of such fillers can detract from their ability to impart improvements in the physical and mechanical properties of the polymer. Some studies have considered surface modification of such fillers to enhance the polymer filler interaction and improve dispersion of the filler in the polymer. With chemical modification, some researchers have found that the concentration of the filler may be increased to 10% without compromising the properties of the composites.

There is a need for new and improved composite materials which use low cost materials and have desirable physical and mechanical properties suitable for a broad range of applications.

SUMMARY

The present disclosure provides a composite material and a method of producing a composite material.

One aspect of the disclosure relates to a composite material comprising a particulate material dispersed in a matrix of thermoplastic polymer and wax.

In one embodiment, the composite material comprises a particulate material dispersed in a homogenous matrix of thermoplastic polymer and wax.

In an alternative embodiment, the composite material comprises a particulate material dispersed in a heterogeneous matrix of thermoplastic polymer and wax.

In one embodiment, the particulate material may be selected from a group comprising fly ash, cenospheres, slag from coal-fired wet-bottom boiler plants, ash from waste incinerators, volcanic ash, residue from waste-to-energy processes, silica, sand, glass, kaolin, red mud, barite, aluminium oxide, iron oxide, titanium dioxide, zirconium oxide, ceramic metal oxides, waste cement particles, wood flour, saw dust, agricultural waste such as nut shell, corn cob particles, rice husk, ground rubber, or a combination of one or more of the foregoing.

In one particular embodiment, the particulate material comprises fly ash.

In one particular embodiment, the thermoplastic polymer may comprise low density polyethylene.

In one particular embodiment, the wax may comprise paraffin.

A further aspect of the disclosure relates to a method of producing a composite material, said method comprising melt mixing thermoplastic polymer and wax with fly ash, thereby dispersing the fly ash in a melt mixture of the composite material.

In one embodiment, the method may further comprise shaping said melt mixture into a desired form and allowing said melt mixture to harden. Shaping the melt mixture may comprise extruding, molding or calendaring.

Another aspect of the disclosure relates to an article of manufacture fabricated from a composite material as described herein.

DESCRIPTION OF THE FIGURE

Various embodiments of the disclosure are described hereinbelow and with reference to the accompanying drawing in which:

The FIGURE diagrammatically illustrates an apparatus and process for preparing a composite material according to embodiments of the invention.

DESCRIPTION OF EMBODIMENTS

The disclosure relates to a composite material, in particular a composite material for use in the building and construction industries. The disclosure also method of producing a composite material.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

It is to be noted that where a range of values is expressed herein, it will be clearly understood that this range encompasses the upper and lower limits of the range, and all values in between these limits.

The term 'about' as used throughout the specification means approximately or nearly and in the context of a numerical value or range set forth herein is meant to encompass variations of ±10% or less, ±5% or less, ±1% or less, or ±0.1% or less of and from the numerical value or range recited or claimed.

Composite Material

The composite material comprises a particulate material dispersed in a matrix of thermoplastic polymer and wax.

The particulate material may be selected from a group comprising fly ash, cenospheres, slag from coal-fired wet-bottom boiler plants, ash from waste incinerators, volcanic ash, residue from waste-to-energy processes, silica, sand, glass, kaolin, red mud, barite, aluminium oxide, iron oxide, titanium dioxide, zirconium oxide, ceramic metal oxides, waste cement particles, wood flour, saw dust, agricultural waste such as nut shell, corn cob particles, rice husk, ground rubber, or a combination of one or more of the foregoing. The particulate materials can be inert (e.g. non-toxic) or non-inert (toxic or potentially harmful).

A range of particle sizes may be utilised to form the composite material, from micro to macro-sized particles depending upon the material and application of the end product.

The composite material may comprise about 10 wt % to about 90 wt % of particulate material, even about 60 wt % to about 90 wt % of particulate material. In particular, the composite material may comprise about 10 wt % to about 90 wt % of fly ash, even about 60 wt % to about 90 wt % of fly ash.

Fly ash may be defined as a solid material extracted from the flue gases of a boiler fired with pulverised coal. Depending upon the source and composition of the coal being burned, as well as the combustion conditions and the pollution control equipment used in its production, the chemical and physical properties of the fly ash may vary. Generally, fly ash includes silica ($SiO_2$) (both amorphous and crystalline), alumina ($Al_2O_3$) and calcium oxide ($CaO$). Fly ash may also include other trace elements including, but not limited to, arsenic, beryllium, boron, cadmium, chromium, cobalt, lead, manganese, mercury, molybdenum, selenium, strontium, thallium and vanadium.

Fly ash particles are generally spherical in shape and range in size from 0.5 μm to 100 μm.

Two grades of fly ash may be nominated according to Australian Standard AS3582.1, Normal Grade and Special Grade. The criteria for classification of fly ashes are based on tests described in various parts of AS3583 (13) with key specified requirements including: fineness (% passing 45 micron sieve); loss on ignition, moisture content, and $SO_3$ content. Special Grade fly ashes, commonly referred to as ultrafine fly ashes, may have the same properties as fine grade fly ashes. They may be either specifically selected from power station precipitator banks that collect finer material from the flue gases, or are collected and post-milled and classified to produce a fine product conforming to the AS3582.1 definition.

It will be appreciated that fly ash may be classified under different standards and specifications in different countries.

Nevertheless, despite the variability in physical and chemical properties of fly ash, it improves one or more of the mechanical properties of the composite material described herein such as stiffness, strength, impact and temperature resistance, dimensional stability, creep, surface hardness, scratch resistance, fire resistance and ultraviolet degradation.

Any thermoplastic polymer can be advantageously used in the composite material. Those which are softened or in a molten form from about 100° C. to about 260° C. are most convenient in terms of reducing energy costs when formulating or when mixing the composite material. Such polymers will be known by those persons skilled in the art and include, but are not limited to, polyolefins, polyamides, polyesters, polymethacrylates, polycarbonates, polyvinyl halides, polyvinyl alcohols, polynitriles, polyacetals, polyimides, polyarylketones, polyetherketones, polyhydroxyalkanoates, polycaprolactones, polystyrenes, polyurethanes, polysulfones, polyphylene oxides, polyphenylene sulphides, polyacetates, liquid crystal polymers, fluoropolymers, ionomeric polymers, and copolymers of any of them and combinations of any two or more of them.

Particularly preferred thermoplastic polymers include polyethylene (including high density polyethylene (HDPE) and low density polyethylene (LDPE)), polypropylene, acrylonitrile butadiene styrene, polymethylmethacrylate, cellulose acetate, cyclic olefin copolymer, ethyl-vinyl acetate, ethylene vinyl alcohol, polytetrafluoroethane, polyoxymethylene, polyacrylonitrile, polyamide 6, polyamide 6,6, polyamide-imide, polyaryletherketone, polybutylene, polybutylene terephthalate, polycaprolactone, polychlorotrifluorethylene, polyetheylene terephthalate, polycyclohexylene dimethylene terephthalate, polycarbonate, polyhydroxybutyrate, polyetheretherketone, polyetherketoneketone, polyetherimide, polyethersulfone, chlorinated polyethylene, polyimide, polylactic acid, polymethylpentene, polyphenylene ether, polyphenylene sulphide, polyphthalamide, polysulphone, polytrimethylene terephthalate, polyurethane, acrylic, polyvinyl acetate, polyvinyl chloride (PVC), polystyrene, nylon, polybutadiene, styrene-acrylonitrile and mixtures thereof.

Polyethylene is particularly suitable for use in the composite material as described herein because it is relatively inert and has a melting temperature that may range from about 105° C. to about 130° C.

Polyethylene may be classified into several different categories based on characteristics such as its density and degree of branching. Its mechanical properties depend significantly on variable such as the extent and type of branching, the crystal structure and the molecular weight. When categorised according to density, polyethylene exists in a number of forms, the most common being high density polyethylene (HDPE), linear low density polyethylene (LLDPE) and low density polyethylene (LDPE).

The properties of LDPE, as shown in Table 1 below, make it suitable for use in the composite material.

TABLE 1

Properties of LDPE

| | |
|---|---|
| Density (g/cm$^3$) | 0.910-0.940 |
| Tensile strength (N/mm$^2$) | 0.20-0.40 |
| Melting point (° C.) | 105-115 |
| Glass transition temperature (° C.) | −125 |
| Elastic (Young's) modulus (GPa) | 0.30 |

LDPE is particularly suitable for use in the composite material as described herein. LDPE is defined by a density range of 0.910-0.940 g/cm$^3$. LDPE has a high degree of short and long chain branching, which means that the chains do not pack into the crystal structure as well. It has, therefore, weaker intermolecular forces and fewer dipole-induced-dipole interactions. This results in a polymeric material with a lower tensile strength and increased ductility. The high degree of branching with long chains gives molten LDPE unique and desirable flow properties.

The quality of the thermoplastic polymer may be prime or reprocessed via recycling. The use of recycled thermoplastic polymer may reduce costs for the manufacturer and may comply with or exceed environmental sustainability requirements.

In some embodiments, the thermoplastic polymer may be present in the matrix of thermoplastic polymer and wax in an amount from about 10% to about 95% by total weight of the matrix. In some embodiments, the thermoplastic polymer may be present in an amount, from about 20% to about 95%, from about 30% to about 95%, from about 30% to about 90%, from about 30% to about 85%, from about 30% to about 80% from about 30% to about 75%, from about 30% to about 70%, from about 30% to about 65%, from about 30% to about 60%, from about 30% to about 55%, from about 30% to about 50%, from about 30% to about 45%, from about 30% to about 40%, or from about 30% to about 35% by total weight of the matrix.

The composite material also comprises wax. As would be understood by a person skilled in the art, waxes belong to a class of chemical compounds that are malleable near ambient temperatures. Characteristically, waxes melt above 45° C. to give a low viscosity liquid. Waxes are hydrophobic but are soluble in organic, nonpolar solvents. All waxes are organic compounds which are both synthetic and naturally derived. Natural waxes are typically esters of fatty acids and long chain alcohols. Synthetic waxes are long-chain hydrocarbons lacking functional groups.

Suitable waxes for use in the composite material include any various hydrocarbons (straight or branched chain alkanes or alkenes, ketone, diketone, primary or secondary alcohols, aldehydes, sterol esters, alkanoic acids, terpenes, monoesters, such as those having a carbon chain length ranging from $C_{12}$-$C_{38}$. Also suitable are diesters or other branched esters. The compound may be an ester of an alcohol (glycerol or other than glycerol) and a $C_8$ or greater fatty acid.

In some embodiments, the wax is selected from one or more of mineral waxes such as paraffin, beeswax (e.g. White Beeswax SP-422P available from Strahl and Pitsch of West Babylon, New York), Chinese wax, lanolin, shellac wax, spermaceti, bayberry wax, candelilla, vegetable waxes such as carnauba wax, insect wax, castor wax, esparto wax, Japan wax, jojoba oil, ouricury wax, rice bran wax, soy wax, lotus wax (e.g. Nelumbo Nucefera Floral Wax available from Deveraux specialities, Silmar, Calif.), ceresin wax, montan wax, ozocerite, peat waxes, microcrystalline wax, petroleum jelly, Fischer-Tropsch waxes, substituted amide waxes, cetyl palmitate, lauryl palmitate, cetostearyl stearate, polyethylene wax (e.g. PERFORMALENE 400, having a molecular weight of 450 and a melting point of 84° C., available from New Phase Technologies of Sugar Land, Tex.), and silicone waxes such as $C_{30-45}$ alkyl methicone and $C_{30-45}$ olefin (e.g. Dow Corning AMS-C30, having a melting point of 70° C., available from Dow Corning of Midland, Mich.).

In some embodiments, the composite material comprises paraffin. Paraffin wax is a type of petroleum product consisting of hydrogen and carbon molecules with 20-40 carbon atoms. Paraffin is widely used in industry and daily life for various applications. The properties of paraffin are shown below in Table 2.

TABLE 2

Properties of Paraffin

| | |
|---|---|
| Density (g/cm$^3$) | 0.88-0.92 |
| Melting point (° C.) | 40-70 |
| Boiling temperature (° C.) | 370 |

In some embodiments, the wax may be present in matrix of the thermoplastic polymer and wax in an amount from about 5% to about 90% by total weight of the matrix. In some embodiments, the wax may be present in an amount, from about 5% to about 80%, from about 5% to about 70%, from about 10% to about 70%, from about 15% to about 70%, from about 20% to about 70% from about 25% to about 70%, from about 30% to about 70%, from about 35% to about 70%, from about40% to about 70%, from about 45% to about 70%, from about 50% to about 70%, from about 55% to about 70%, from about 60% to about 70%, or from about 65% to about 70% by total weight of the matrix.

The fly ash may be dispersed in a homogenous matrix of thermoplastic polymer and wax. The term 'homogenous matrix' as used herein refers to a continuous phase in which the thermoplastic polymer and wax are intimately mixed with one another to the extent that the matrix has uniform composition and properties throughout and particles of thermoplastic polymer and wax are indistinguishable throughout.

Alternatively, the fly ash may be dispersed in a heterogeneous matrix of thermoplastic polymer and wax. The term 'heterogeneous matrix' as used herein refers to a mixture in which particles of thermoplastic polymer are distinguishable within a matrix of wax.

The particles of thermoplastic polymer may be of any suitable morphology and have a particle size up to 5 mm. Generally, the particles of thermoplastic polymer may be prepared by extruding and cutting to a desired particle size. The thermoplastic polymer particles may be optionally coated in wax before preparing said heterogeneous matrix or the composite material as described herein. The wax coating may include other additives for specific purposes, as described below.

In one embodiment, the composite material may comprise a particulate material dispersed in a heterogeneous matrix, wherein the heterogeneous matrix comprises particles of a first thermoplastic polymer dispersed in a homogenous matrix comprising wax and a second thermoplastic polymer having a lower melting point than the first thermoplastic polymer and being capable of forming the homogenous matrix with wax.

The ratio of fly ash to said matrix in the composite material may be from about 20:80 to about 80:20, or from about 60:40 to about 70:30, or from about 70:30 to about 75:25.

In some embodiments, the composite material may optionally comprise one or more additives in an amount that is sufficient to obtain a desired processing or performance property for the composite material. The amount of additive(s) should not be wasteful of the additive nor detrimental to the processing or performance of the composite material.

Illustrative examples of optional additives include, but are not limited to, adhesion promoters, biocides (antibacterials, fungicides, and mildewcides); anti-fogging agents; anti-static agents; bonding, blowing and foaming agents; dispersants, fillers and extenders; fire and flame retardants and smoke suppressants; impact modifiers; initiators; lubricants; micas; pigments, colorants and dyes; plasticizers; processing aids; release agents; silane, titanates and zirconates; slip and anti-blocking agents; stabilizers; stearates; ultraviolet light absorbers; viscosity regulators; and combinations thereof.

Where ash or other materials that have already been oxidised and do not act as a fuel source are used as the particulate ingredient, the composite material is thought to have beneficial qualities for construction with regard to flame resistance. Without being bound by theory, it is thought that a large proportion of non-combustible particulate material in the polymer and wax matrix (whether including fire retardant chemicals or otherwise) will act to resist or extinguish flames on one face of a building structure, for example. Moreover, it may be possible to subsequently repair a structural member formed from the composite material as disclosed herein, in contrast to a concrete material following flame damage.

The composite material as disclosed herein can be used as one or more layer in a multi-layer sandwich structure, which may also include insulative materials, structural metal, renderings and/or coatings, etc. In the event that the composite material as disclosed herein is utilised for construction of outdoor structures, an external rendering or coating may improve resistance of the polymer component(s) to degradation due to ultraviolet rays from incident sunlight. Surface layers or rendering with suitable substances can also be used to improve fire resistance of the overall structure. Of course, for applications that are underground or underwater, for example, fire resistance and UV-degradation is immaterial.

Composite materials constructed according to embodiments of the present invention have been found to have very desirable performance characteristics. For example, the product performance test results shown in Table 3, below, were achieved under a US DOE test regime by a NATA approved lab.

TABLE 3

Product Performance Test Results

| Composition | Compression | Durometer | Leachability |
|---|---|---|---|
| 60% waste particulate, 40% polymer/wax matrix | 2550 psi | 59 Shore D | 0.023% |
| 70% waste particulate, 30% polymer/wax matrix | 2923 psi | 63 Shore D | 0.023% |
| 80% waste particulate, 20% polymer/wax matrix | 2873 psi | 57 Shore D | 0.134% |

(Leachability measurement following 11 days immersed in distilled water)

Method of Producing the Composite Material

The method of producing a composite material comprises melt mixing thermoplastic polymer and wax with the particulate material, thereby dispersing the particulate material in said melt mixture of the composite material.

In one embodiment, prior to melt mixing the particulate material with the thermoplastic polymer and wax, the particulate material may be comminuted to a desired particle size by any suitable conventional techniques as will be known to those skilled in the art including, but not limited to, grinding, crushing, milling.

Advantageously, the particulate material does not require drying prior to melt mixing because the thermal energy from the melt mixing step is generally sufficient to reduce moisture content of the particulate material as it is dispersed in the matrix of thermoplastic polymer and wax.

The terms 'melt mixing' or 'mechanical melt mixing' are interchangeable and as used herein refers to a mechanical process whereby the fly ash and the mixture of thermoplastic polymer and wax are mechanically mixed while said mixture is in a molten or liquid state. Melt mixing is therefore intended to be distinct from the mere addition of fly ash to the molten mixture or vice versa, where mixing and dispersion of the fly ash through the mixture will be limited or non-existent and rather ineffective.

Melt mixing can be advantageously performed using techniques and equipment known in the field. For example, melt mixing may be achieved using continuous extrusion equipment such as twin screw extruders, single screw extruders, other multiple screw extruders and Farell mixers.

The melt mixture may comprise a homogenous mixture of thermoplastic polymer and wax which cools to a homogenous matrix.

Alternatively, the melt mixture may comprise a heterogeneous mixture of thermoplastic polymer and wax, as previously described. When cooled, the thermoplastic polymer is dispersed in the heterogeneous mixture as particles of thermoplastic polymer in a matrix of wax.

When performing the method as described herein, the thermoplastic polymer and wax and the particulate material (e.g. fly ash) may be introduced into the melt mixing equipment together or separately. The thermoplastic polymer, wax and optionally one or more additives may also be introduced into the melt mixing equipment together or separately.

In some embodiments particles of thermoplastic polymer coated in wax may be introduced into the melt mixing equipment to prepare a homogenous matrix of thermoplastic polymer and wax. In this particular embodiment, the melting point of the thermoplastic polymer is less than the operating temperature of the melt mixing equipment so that both the thermoplastic polymer and the wax soften and melt below the operating temperature and combine to produce the homogenous matrix. The particulate material (e.g. fly ash)

may be introduced into the melt mixing equipment, together with or separately from the wax-coated thermoplastic polymer particles.

Alternatively particles of thermoplastic polymer coated in wax may be introduced into the melt mixing equipment to prepare a heterogeneous matrix of thermoplastic polymer and wax. In this alternative embodiment the melting point of the thermoplastic is higher than the operating temperature of the melt mixing equipment. Accordingly, under the operating temperature the thermoplastic polymer particles retain their shape and morphology while the wax softens and melts, thereby producing a heterogeneous matrix of thermoplastic polymer particles dispersed within a molten wax matrix. The particulate material (e.g. fly ash) may be introduced into the melt mixing equipment, together with or separately from the wax-coated thermoplastic polymer particles.

In some embodiments, a heterogeneous matrix comprising wax, a first thermoplastic polymer and a second thermoplastic polymer having a lower melting point than the first thermoplastic polymer and capable of forming a homogenous matrix with wax, may be prepared. Particles of the first and second thermoplastic polymers, optionally coated in wax, may be introduced into the melt mixing equipment, together with or separately from the particulate material (e.g. fly ash) and wax. In this particular embodiment, the particulate material and first thermoplastic polymer are dispersed in a homogenous matrix of the second thermoplastic polymer and wax.

The melt mixture provides a relatively low viscous molten matrix in which the particulate material may be dispersed.

One embodiment of the method as described herein may be illustrated with reference to FIG. 1 which is a diagrammatic representation of an apparatus 100 for carrying out the method. In the apparatus 100, particulate material 12 is fed into a melt mixing device 14 via a hopper 16. The binding materials 10 such as thermoplastic polymer, wax and optionally one or more additives, as disclosed herein, can be added to the melt mixing device 14 separately from the particulate material via one or more hoppers 18.

The melt mixing device 14 may comprise a screw conveyor which facilitates mixing of the particulate material and a homogenous (or heterogeneous) mixture of thermoplastic polymer and wax, and can convey the resulting mixture through one or more heating zones 22, 24, 26 to melt said mixture and disperse the particulate material through the resulting molten matrix.

The feeding process can be automated and preferably microprocessor controlled. Multiple feeders may be used with each individual feeder being regulated by a master controller which monitors and adjusts the delivery of the particulate material, wax and thermoplastic polymer(s) to maintain the desired weight or volume ratio amongst these components.

Advantageously, the particulate material may be subject to drying within the melt mixing device 14 as it passes a heating element 20 prior to melt mixing with the thermoplastic polymer and wax.

The method may further comprise shaping the resulting composite material 30 produced by the melt mixing device 14 into a desired form before allowing said melt mixture to harden. In embodiments, shaping the melt mixture may include extruding, molding or calendaring the material into the desired form.

In one particularly advantageous application the composite material as disclosed herein can be employed in an additive manufacturing process, wherein the composite material is melt mixed and formed into a structure or article of manufacture in a single procedure/apparatus. For example, international patent publication WO 2017/035584 describes a reinforced additive manufacturing process for the manufacture of composite materials that may be employed for use with composite materials as disclosed herein. The disclosure and contents of that publication are hereby incorporated herein by reference.

Any number of articles of manufacture may be fabricated from the composite material as described herein. Illustrative examples of articles of manufacture include, but are not limited to, appliances such as refrigerators, freezers, washing machines, drying machines, toasters, blenders, vacuum cleaners, kettles, coffee makers, mixers, processors; building and construction articles such as panels, fences, decks and rails, floors, floor coverings, pipes and fittings, siding, trim, windows, window shutters, doors, mouldings; plumbing products such as toilet seats and wall coverings; consumer goods such as power hand tools, rakes, shovels, lawn mowers; sports and leisure equipment such as golf clubs, fishing boles and watercraft; electrical/electronic equipment such as printers, computer housings, business equipment, projectors, telecommunication equipment; healthcare products such as wheelchairs, beds, testing equipment, and packaging; industrial products such as containers, bottles, drums, material handling, gears, bearings, gaskets and seals, valves, wind turbines and safety equipment; packaging for consumer goods such as food and beverage, cosmetics, detergents and cleaners, personal care, pharmaceutical and wellness products; transportation articles such as automotive aftermarket parts, bumpers, window seals, instrument panels, consoles, under hood electrical and engine covers; and military and defence articles such as tank shielding, underground or surface bunkers, shatter resistant shielding, and so forth.

Such articles may be molded, extruded, or calendared from the composite material by conventional techniques as will be well understood by those skilled in the art. It will be appreciated that the composite material may be heated to a temperature at which the composite material may be capable of being molded, extruded or calendared into the desired shapes and forms of the articles of manufacture, followed by natural or accelerated cooling to form the final desired article.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A composite building material comprising a particulate material dispersed in a matrix of thermoplastic polymer and wax, wherein the composite building material comprises from about 60% to about 90% by weight of particulate material, and wherein wax is present in an amount of at least about 25% by weight of the matrix.

2. The composite building material according to claim 1, wherein the composite building material comprises a particulate material dispersed in a homogenous matrix of thermoplastic polymer and wax.

3. The composite building material according to claim 1, wherein the composite building material comprises a particulate material dispersed in a heterogeneous matrix of thermoplastic polymer and wax.

4. The composite building material according to claim 1, wherein the composite building material comprises a particulate material dispersed in a heterogeneous matrix, wherein the heterogeneous matrix comprises particles of a first thermoplastic polymer dispersed in a homogenous matrix of wax and a second thermoplastic polymer having a lower melting point than the first thermoplastic polymer and being capable of forming the homogenous matrix with wax.

5. The composite building material according to claim 1, wherein the particulate material is selected from a group comprising fly ash, cenospheres, slag from coal-fired wet-bottom boiler plants, ash from waste incinerators, silica, sand, kaolin, red mud, barite, aluminium oxide, iron oxide, titanium dioxide, zirconium oxide, ceramic metal oxides, wood flour, saw dust, nut shell, corn cob particles, rice husk, ground rubber or a combination of two or more of the foregoing.

6. The composite building material according to claim 5, wherein the particulate material comprises fly ash.

7. The composite building material according to claim 6, wherein the from about 60% to about 90% by weight of particulate material consists of fly ash.

8. The composite building material according to claim 1, wherein the thermoplastic polymer comprises low density polyethylene.

9. The composite building material according to claim 1, wherein the wax comprises paraffin.

10. The composite building material according to claim 1, wherein the wax may be present in the matrix in an amount from about 30% to about 50% by total weight of the matrix.

11. The composite building material according to claim 1, wherein the thermoplastic polymer may be present in the matrix in an amount from about 10% to about 75% by total weight of the matrix.

12. A method of producing a composite building material, said method comprising melt mixing thermoplastic polymer and wax with a particulate material, thereby dispersing the particulate material in a melt mixture of the composite building material, wherein the composite building material comprises from about 60% to about 90% by weight of particulate material, and wherein wax is present in an amount of at least about 25% by weight of the melt mixture.

13. The method according to claim 12, wherein the step of melt mixing comprises introducing thermoplastic polymer particles coated in wax together with or separately from the particulate material into melt mixing equipment and allowing the wax, and optionally the thermoplastic polymer particles, to soften and melt at an operating temperature of the melt mixing equipment thereby producing the melt mixture.

14. The method according to claim 12, wherein the method further comprises shaping said melt mixture into a desired form and allowing said melt mixture to harden.

15. The method according to claim 14, wherein shaping the melt mixture comprises extruding, molding or calendaring.

16. A composite building material produced by the method of claim 12.

17. An article of manufacture fabricated from a composite building material according to claim 1.

* * * * *